Figure 1:
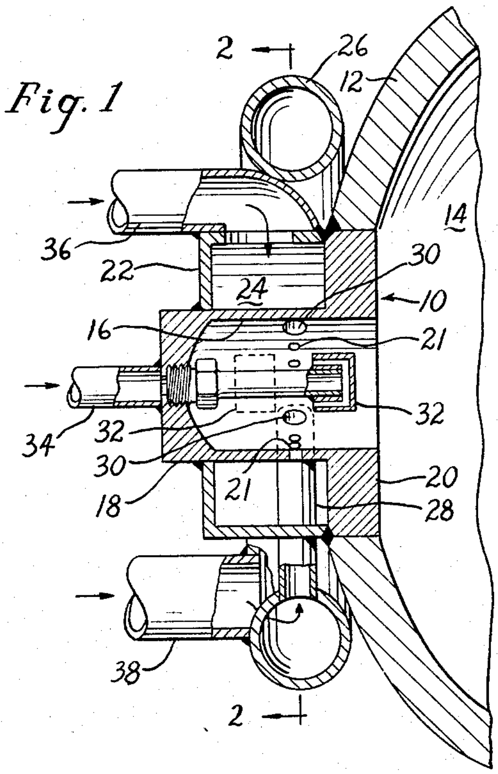

Nov. 22, 1966 J. D. LEDBETTER 3,286,997

VORTEX FUEL INJECTOR

Filed April 18, 1961

INVENTOR.
JAMES D. LEDBETTER

BY William R. Wright

AGENT

United States Patent Office 3,286,997
Patented Nov. 22, 1966

3,286,997

VORTEX FUEL INJECTOR

James D. Ledbetter, Cedar, Grove, N.J., assignor to Thiokol Chemical Corporation, Bristol, Pa., a corporation of Delaware Filed Apr. 18, 1961, Ser. No. 103,826
4 Claims. (Cl. 261—18)

This invention relates generally to a device for feeding fuel and more particularly to a vortex type fuel injector for combustion chambers.

Fuel injectors of the vortex type are known in the art and are characterized by certain advantages in the mixing of the fuel with other fuel or gases to form a readily combustible mixture.

In the past considerable difficulty has been experienced in designing a vortex type fuel injector which would establish and hold a true vortex to thus provide an optimum combustible mixture for the combustion chamber. These difficulties arose in trying to provide means for introducing the fuel without affecting natural vortex movement as a result of the nature of the fuel, or of structural considerations which also might impede the vortex movement with an unnecessary pressure drop.

Accordingly, the main object of the present invention is to provide an improved vortex fuel injector for establishing and maintaining a substantially true vortex of the fuel for vortex combustion in a combustion chamber.

An important object of the present invention is to provide a single improved vortex fuel injector of the type described for two fluid fuels to be injected into a combustion chamber.

Another important object of the present invention is to provide a single improved fuel injector for combustion chambers which will efficiently inject two fuels into a combustion chamber with one of the fuels being in both gaseous and liquid form.

A further important object of the present invention is to provide an improved vortex fuel injector for two propellants in which one of the propellants is split and injected as both a gas and a liquid into the same tangential plane.

A still further important object of the present invention is to provide an improved vortex fuel injector for combustion chambers which is simple in construction, susceptible of ready and economical manufacture, and of long life in use.

Other objects and advantages of the invention will become apparent during the course of the following description.

In its broadest aspects, the invention contemplates an improved vortex fuel injector for injecting fuels therein both as a gas and as a liquid to obtain an optimum vortex combustion mixture for the combustion chamber.

Figure 3:
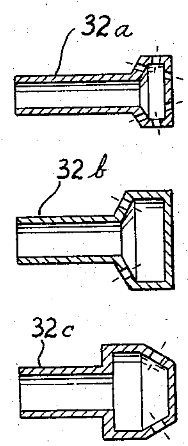
Figure 2:
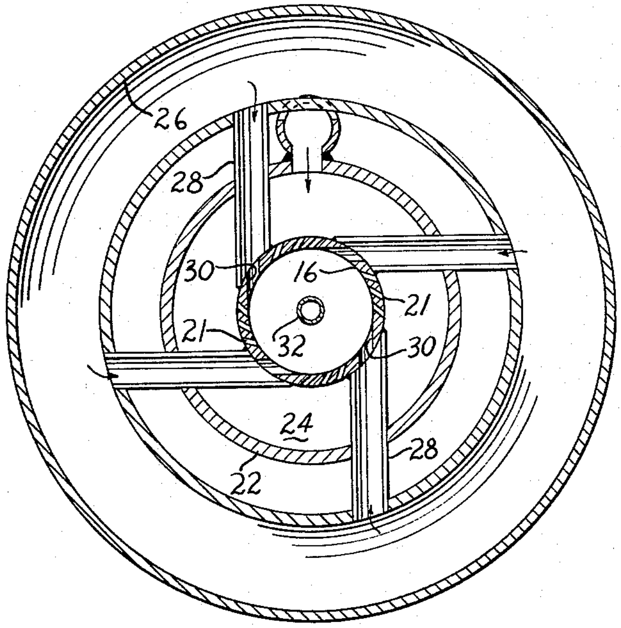

In the drawings I have shown one embodiment of the invention. In this showing:

FIGURE 1 is a central, longitudinal, sectional view of the vortex injector comprising the present invention showing the fuel feeding conduits and the association of the injector with a combustion chamber; and FIGURE 2 is a transverse sectional view thereof taken on the line 2—2 of FIGURE 1; and FIGURE 3 illustrates alternate forms of the axial nozzle which may be used in the injector.

Referring to the drawings, the injector comprising the present invention and designated as a whole by numeral 10, which may be used with any of many types of combustion chambers, is shown mounted coaxially on the head 12 of the cylindrical combustion chamber 14 of a rocket motor.

The injector 10 comprises an inner injector cylinder or vortex chamber 16 having a closed end 18 and an end opening onto the combustion chamber 14 and being flanged as at 20. A plurality of circumferentially spaced, tangentially disposed orifices 21 are formed in the wall of the cylinder 16. A second cylinder 22 is mounted concentrically on and fixed to the cylinder 16 and, with the flange 20, defines a propellant receiving chamber 24 or manifold surrounding the orifices 21.

An annular manifold 26 is rigidly mounted on the inner injector cylinder 16 by means of a plurality of angularly spaced conduits 28 passing through the cylinder 22 in a gas tight manner. The conduits 28 are arranged tangentially of and fixed to the periphery of the cylinder 16 and communicate therewith by means of ports 30.

A propellant injection nozzle 32 is mounted in the wall 18 of the injector cylinder 16 for the injection of fuel with an axial component at any angle between its full line position and the dotted line position shown depending on which exemplary form of nozzle 32, **32*a*, 32*b* or 32*c* is employed. It is to be noted that these two extremes of position are respectively downstream and upstream of the plane of the orifices 21 and of the orifices 30**, the latter two planes coinciding.

The propellant fuels are pressurized and one liquid propellant is fed to the nozzle 32 by a conduit 34. Another propellant is split and divided into a gas and a liquid by suitable means (not shown), or separate additional gas and liquid propellants are provided and the liquid portion is delivered under pressure to the injector cylinder 16 by means of a conduit 36, the manifold chamber 24, and the tangential orifices 21. The gaseous portion is delivered to the injector cylinder 16 by means of a conduit 38, the annular manifold 26, the tangentially arranged conduits 28, and the ports 30.

It will now be apparent that during operation, the gaseous portion of the propellant enters the vortex cylinder 16 tangentially and is deflected into a whirling or circular motion tending to form a cavity or vacuum in the center of the vortex cylinder 16. This action is enhanced by the liquid propellant portion entering the vortex cylinder between its wall and the whirling gaseous portion by the tangential orifices 21 and the gaseous and liquid portions are thoroughly admixed together and with the liquid propellant injected with an axial component from the axial nozzle 32 or its alternate forms **32*a*, 32*b* or 32*c*** within the vortex.

It is to be noted that a vortex is thusly not only readily established but maintained by the action of the gaseous portion in partially offsetting the inherent tendency of the established vortex to attract the heavier propellant particles inwardly, the thorough mixing reducing the size and weight of the particles.

It will be appreciated that the fuel injector comprising the present invention not only provides an improved vortex of mixed fuels but also effectively and efficiently combines three injectors into one. The vortex injector is readily adaptable to several propellants such as oxygen, $ClF_3$, $F_2$, $H_2O_2$, $N_2H_4$, and many others.

It is to be understood that the form of the invention herewith shown and described is to be taken as a preferred example of the same and that various changes in the shape, size and arrangement of parts may be resorted to without departure from the spirit of the invention or the scope of the subjoined claims.

What is claimed is:

1. A vortex fuel injector for combustion chambers comprising, in combination, a cylindrical vortex chamber mounted on and communicating with a combustion chamber, means communicating with said vortex chamber at circumferentially spaced ports to supply gaseous fuel tangentially thereto to establish a fuel vortex therein, second means communicating with said vortex chamber to supply liquid fuel from a nozzle located along the central axis of said vortex chamber into said vortex, and additional means communicating with said vortex chamber at circumferentially spaced orifices between said first mentioned spaced ports and in the same transverse plane of the vortex chamber to supply liquid fuel tangentially therewithin between its wall and said gaseous fuel to thoroughly mix with both said fuels in said vortex chamber before passing into the combustion chamber.

2. The combination as recited in claim 1 wherein said axially supplied fuel is supplied upstream of said plane.

3. The combination as recited in claim 1 wherein said axially supplied fuel is supplied at a point coinciding with said plane.

4. The combination as recited in claim 1 wherein said axially supplied fuel is supplied downstream of said plane.

References Cited by the Examiner

UNITED STATES PATENTS

| | | | |
|---|---|---|---|
| 1,756,805 | 4/1930 | Baker | 261—79 |
| 2,368,827 | 2/1945 | Hanson et al. | 23—259 |
| 2,590,660 | 3/1952 | Skoog et al. | 23—259 |
| 2,653,801 | 9/1953 | Fontein et al. | |
| 2,656,254 | 10/1953 | Heller | 23—259 X |
| 2,877,717 | 3/1959 | Reed | 23—259 |
| 2,890,746 | 6/1959 | Dollinger | 23—259 X |

HARRY B. THORNTON, *Primary Examiner.*

C. D. QUARFORTH, L. D. ROSDOL, *Examiners.*